United States Patent
Aposhian et al.

(10) Patent No.: US 10,779,482 B2
(45) Date of Patent: Sep. 22, 2020

(54) SOD HARVESTER STACKING HEAD

(71) Applicant: FireFly Automatix, Inc., North Salt Lake, UT (US)

(72) Inventors: Steven R. Aposhian, Farmington, UT (US); Eric E. Aston, Farmington, UT (US); William M. Decker, Salt Lake City, UT (US); Samuel H. Drake, Cottonwood Heights, UT (US)

(73) Assignee: FireFly Automatix, Inc., North Salt Lake, UT (US)

( * ) Notice: Subject to any disclaimer, the term of this patent is extended or adjusted under 35 U.S.C. 154(b) by 371 days.

(21) Appl. No.: 15/885,958

(22) Filed: Feb. 1, 2018

(65) Prior Publication Data

US 2019/0230872 A1    Aug. 1, 2019

(51) Int. Cl.
| | | |
|---|---|---|
| *A01G 20/15* | (2018.01) | |
| *A01B 76/00* | (2006.01) | |
| *B65G 57/03* | (2006.01) | |
| *B65G 57/11* | (2006.01) | |

(52) U.S. Cl.
CPC .............. *A01G 20/15* (2018.02); *A01B 76/00* (2013.01); *B65G 57/03* (2013.01); *B65G 57/11* (2013.01); *B65G 2201/0202* (2013.01)

(58) Field of Classification Search
CPC ........ A01G 20/15; B65G 57/03; B65G 47/24; B65G 47/086; G05B 19/23
USPC ...................................................... 172/19, 20
See application file for complete search history.

(56) References Cited

U.S. PATENT DOCUMENTS

| | | | | |
|---|---|---|---|---|
| 3,326,592 A | * | 6/1967 | Pelton .................... | A01G 20/12 294/61 |
| 3,901,324 A | * | 8/1975 | Fisher .................... | A01G 20/12 172/19 |
| 5,217,078 A | * | 6/1993 | Zinn ...................... | A01G 20/15 172/19 |
| 5,269,379 A | * | 12/1993 | Millar et al. .......... | A01G 20/15 172/19 |
| 7,070,004 B2 | * | 7/2006 | Hendriks et al. ...... | A01G 20/15 172/20 |
| 8,196,982 B1 | * | 6/2012 | Crunkelton ............ | A01G 20/15 294/61 |
| 8,888,154 B2 | * | 11/2014 | Tvetene ................. | A01G 20/15 294/61 |

(Continued)

*Primary Examiner* — Thomas B Will
*Assistant Examiner* — Joel F. Mitchell
(74) *Attorney, Agent, or Firm* — Kirton McConkie; Brian Tucker

(57) ABSTRACT

A sod harvester stacking head can include a base that couples to a stacking head supporting mechanism of a sod harvester and a frame that couples to the base via crankshaft assemblies that are configured to allow the frame to rotate through 360 degrees during each stacking operation. Accordingly, a motor that controls the rotation of the crankshaft assemblies can be driven a single time during each stacking operation thereby enhancing the efficiency of the sod harvester. The crankshaft assemblies can also be configured so that the crankshafts are in a vertical orientation while the stacking head travels in a lateral direction such that the load is centered on the rotational axis of the stacking head. A stacking conveyor could similarly be configured with a base and a frame that are coupled via crankshaft assemblies to thereby allow the stacking conveyor to be lifted using 360 degrees of rotation.

20 Claims, 10 Drawing Sheets

(56) References Cited

U.S. PATENT DOCUMENTS 9,022,720 B2 * 5/2015 Aposhian et al. ..... G05B 19/23
　　　　　　　　　　　　　　　　　　　　414/799
9,363,937 B2 * 6/2016 Aposhian et al. ..... B65G 43/08
9,902,566 B2 * 2/2018 Pedretti et al. ......... B65B 35/58

* cited by examiner

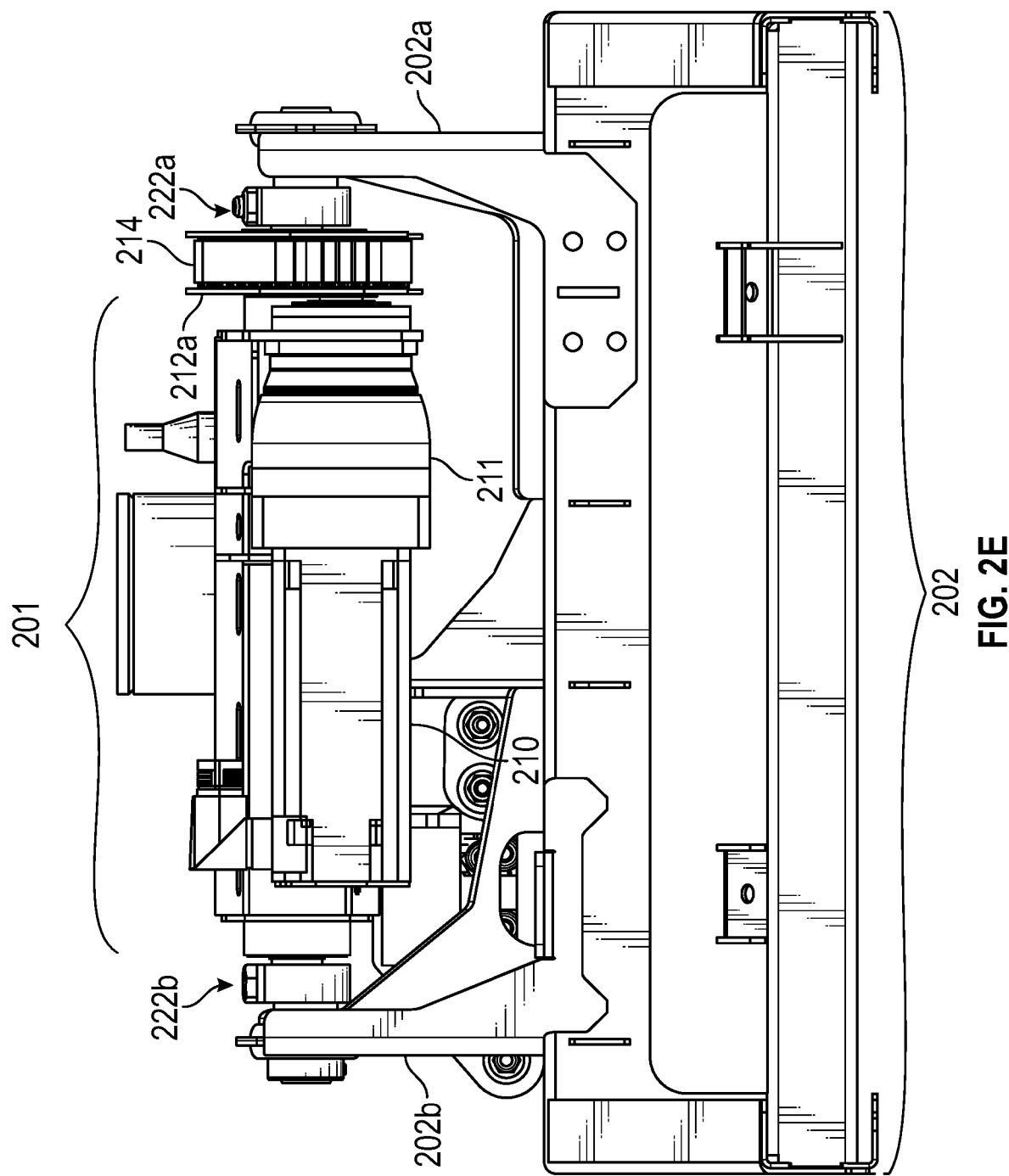

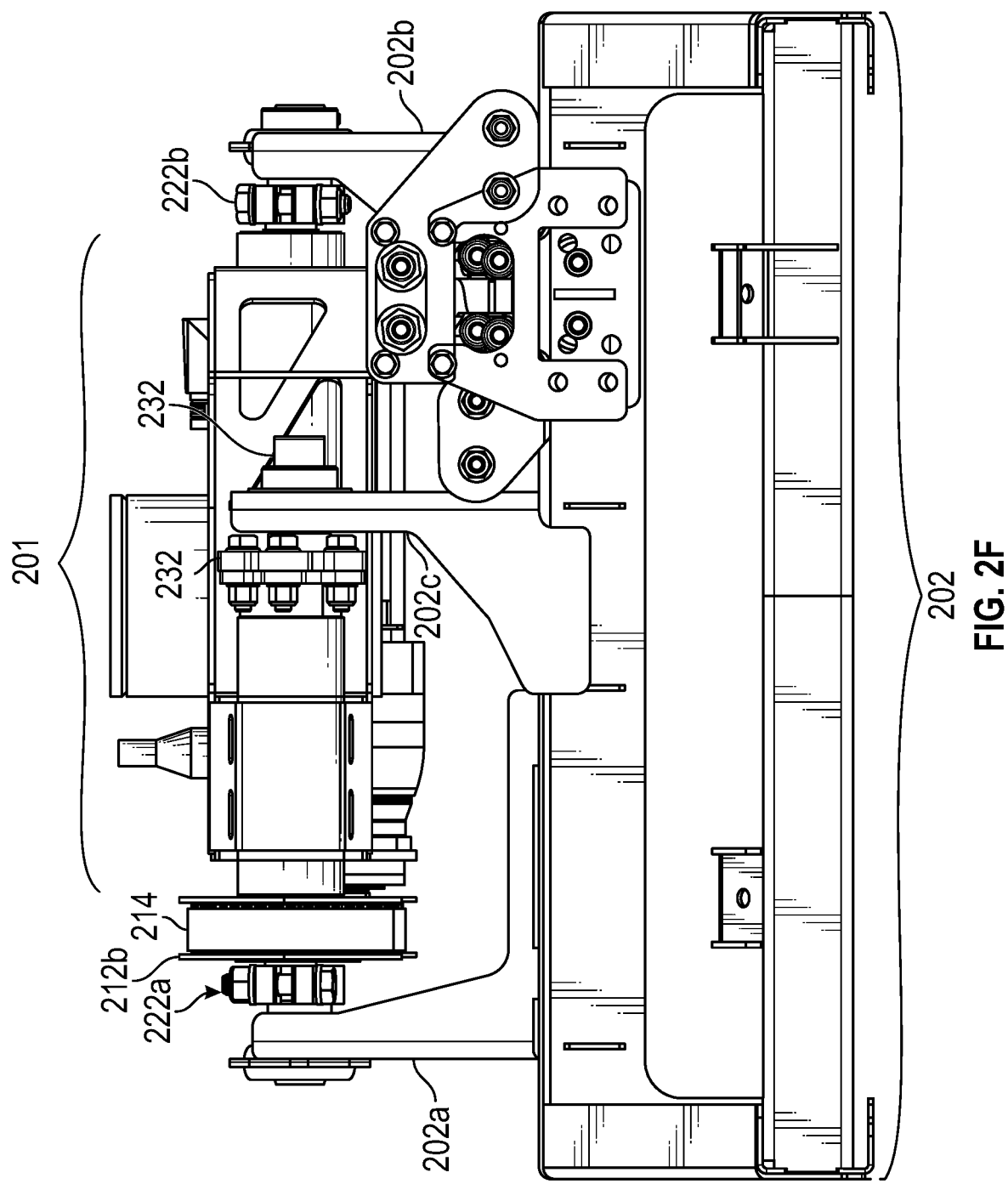

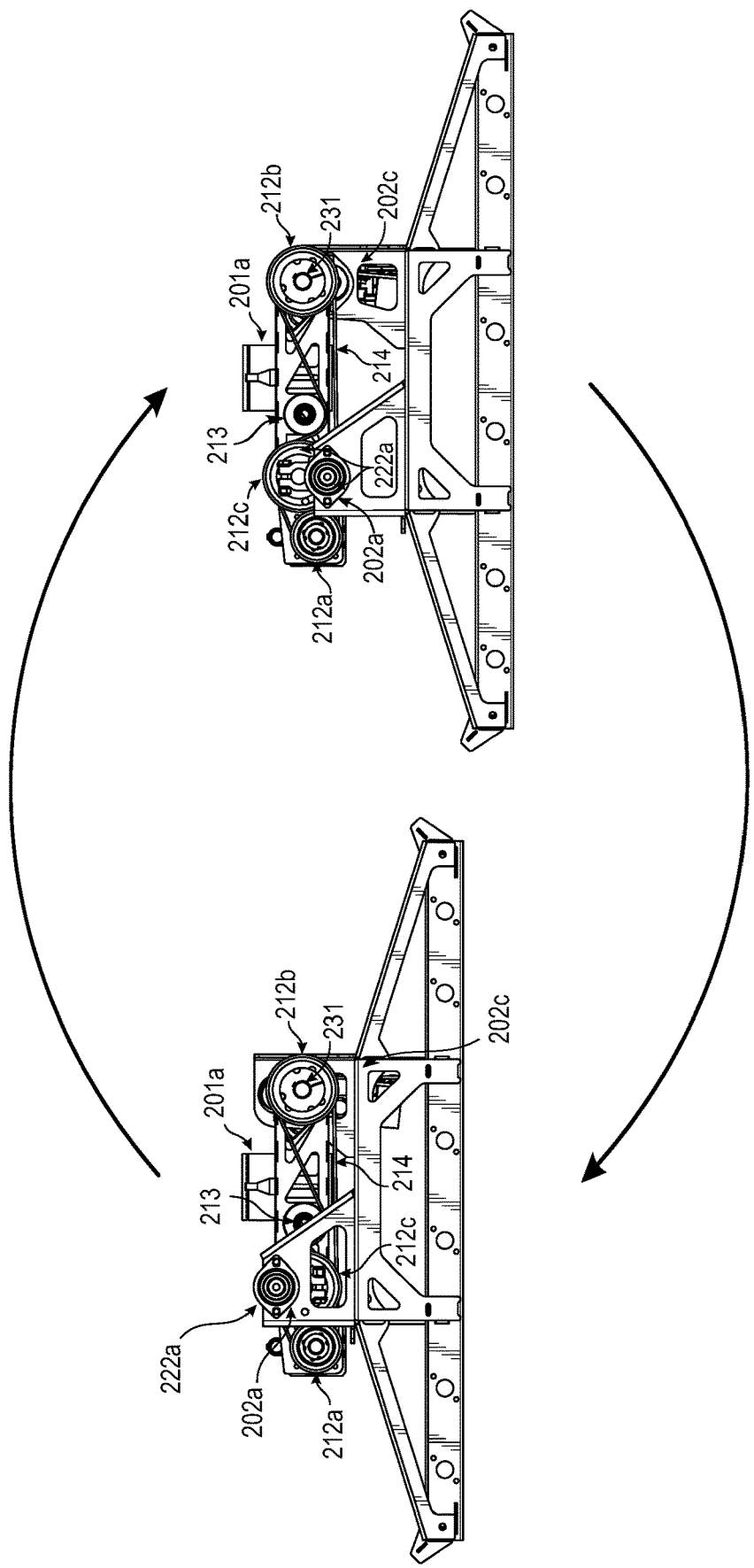

SOD HARVESTER STACKING HEAD

CROSS-REFERENCE TO RELATED APPLICATIONS

N/A

BACKGROUND

Turf grass (sod) is a living organism that must be handled properly to ensure its survival when it is removed from one location and transplanted to another. Sod is generally harvested using large machinery such as sod harvester 100 shown in FIG. 1. Sod harvester 100 is in the form of a tractor and includes a cutting head 101 that cuts slabs of sod from the ground, inclined conveyor(s) 102 that elevate the slabs from the ground towards a stacking conveyor 103, a stacking head 105 that is mounted to a support mechanism 104, and a pallet dispenser 106 that is positioned adjacent a pallet support (not visible) on which stacking head 105 stacks slabs that it has removed from stacking conveyor 103.

The slabs may be flat or in rolls when they are removed from stacking conveyor 103. In either case, to remove the slabs, stacking head 105 can descend towards stacking conveyor 103 to grab and remove the slabs and then travel in a lateral direction to stack the slabs on the pallet. Alternatively, some sod harvesters may be configured to elevate the stacking conveyor towards a stacking head that maintains a fixed vertical position.

Various techniques can be employed to move stacking head 105 in a vertical direction. For example, stacking head 105 could be coupled to support mechanism 104 via linear actuators that cause stacking head 105 to move along a single vertical axis. However, linear actuators have a number of difficulties especially when sod is harvested at high rates. To address these difficulties, stacking heads have been developed which travel along an arc to remove sod from the stacking conveyor. An example of this type of stacking head is shown in FIGS. 5A-5C of U.S. Pat. No. 9,363,937 (hereinafter "the '937 stacking head").

Although the '937 stacking head provides a number of improvements, its design still limits the performance of a sod harvester. For example, after removing sod from the stacking conveyor, the arms of the '937 stacking head are in a horizontal orientation when the stacking head travels in a lateral direction towards the pallet. This significantly increases the amount of torque on the rotational coupling between the stacking head and the support mechanism. The arcuate movement of the '937 stacking head also requires the motor to actuate multiple times for a single stacking operation.

BRIEF SUMMARY

The present invention extends to a sod harvester stacking head that is configured in a way that centers the load that the stacking head carries while it is travelling in a lateral direction. The configuration also allows the stacking head to rotate 360 degrees during a stacking operation. In this way, the stacking head can be operated more efficiently and with reduced stress on the supporting components.

The stacking head can include a base that is configured to couple to a support mechanism of a sod harvester. The stacking head can also include a frame that includes a number of sod securing components that can be actuated to remove sod from a stacking conveyor. The frame is coupled to the base via crankshaft assemblies that are configured to allow the frame to rotate through 360 degrees during each stacking operation. Accordingly, a motor that controls the rotation of the crankshaft assemblies can be driven a single time during each stacking operation thereby enhancing the efficiency of the sod harvester. The crankshaft assemblies can also be configured so that the crankshafts are in a vertical orientation while the stacking head travels in a lateral direction such that the load is centered on the rotational axis of the stacking head. A stacking conveyor could similarly be configured with a base and a frame that are coupled via crankshaft assemblies to thereby allow the stacking conveyor to be lifted using 360 degrees of rotation.

In one embodiment, the present invention is implemented as a sod harvester stacking head that includes a base and a frame. The base is configured to mount to a support mechanism overtop a stacking conveyor of a sod harvester. The support mechanism enables the stacking head to travel in a lateral direction to stack slabs of sod that were removed from the stacking conveyor. The frame is coupled to the base via one or more crankshaft assemblies. The crankshaft assemblies are configured to cause the frame to travel through 360 degrees of rotation during a stacking operation.

In another embodiment, the present invention is implemented as a sod harvester that includes: a cutting head configured to cut slabs of sod from the ground; one or more inclined conveyors that are configured to receive the slabs and advance the slabs towards a stacking conveyor; the stacking conveyor that is configured to support one or more slabs prior to a stacking operation; and a stacking head that is configured to remove the one or more slabs from the stacking conveyor as part of the stacking operation. The stacking head comprises a base and a frame. The base is coupled to a support mechanism that enables the stacking head to travel in a lateral direction. The frame is coupled to the base via one or more crankshaft assemblies that enable the frame to be rotated through 360 degrees during the stacking operation.

In another embodiment, the present invention is implemented as a sod harvester stacking head that comprises a base that includes a rotational coupling by which the stacking head is coupled to a sod harvester and a frame that couples to the base via first and second crankshaft assemblies. The frame includes sod securing components. The first crankshaft assembly comprises a first shaft that extends between opposing sides of the base at a first end of the base and crankshafts coupled to opposing ends of the first shaft. The second crankshaft assembly comprises a second shaft that extends between opposing sides of the base at a second end of the base opposite the first end and either a crankshaft coupled to one end of the second shaft or crankshafts coupled to opposing ends of the second shaft. Each crankshaft comprises an arm portion having a first end coupled to the corresponding shaft and a second end from which a pin portion extends such that the pin portion is offset from a rotational axis of the corresponding shaft. Each pin portion couples to the frame.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2E illustrates a rear view of the sod harvester stacking head of FIG. 2A;

FIG. 2F illustrates a front view of the sod harvester stacking head of FIG. 2A;

FIGS. 4A and 4B each illustrates multiple orientations of the sod harvester stacking head of FIG. 2A.

DETAILED DESCRIPTION

Figure 1:
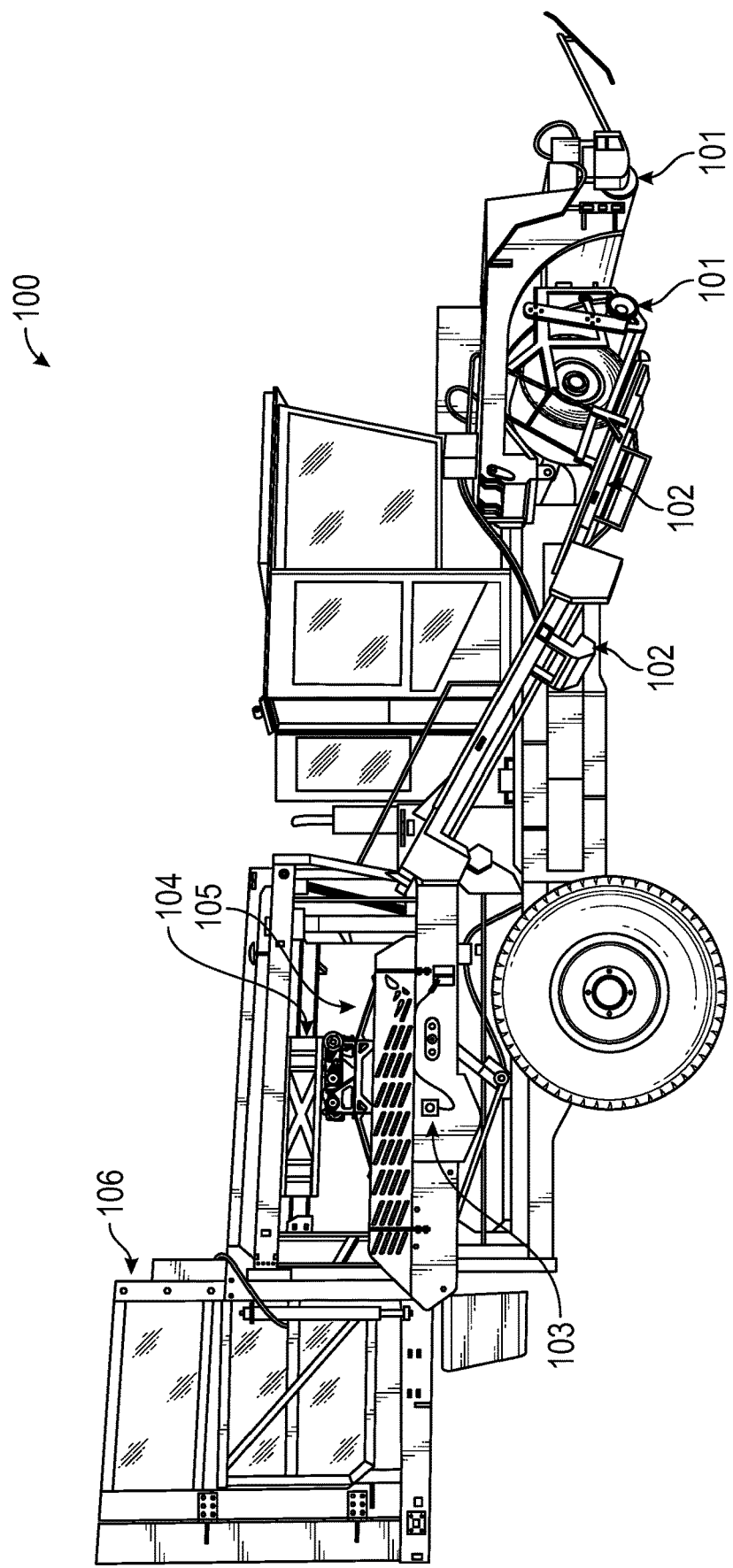
FIG. 1 illustrates an example of a prior art sod harvester.
Figure 2A:
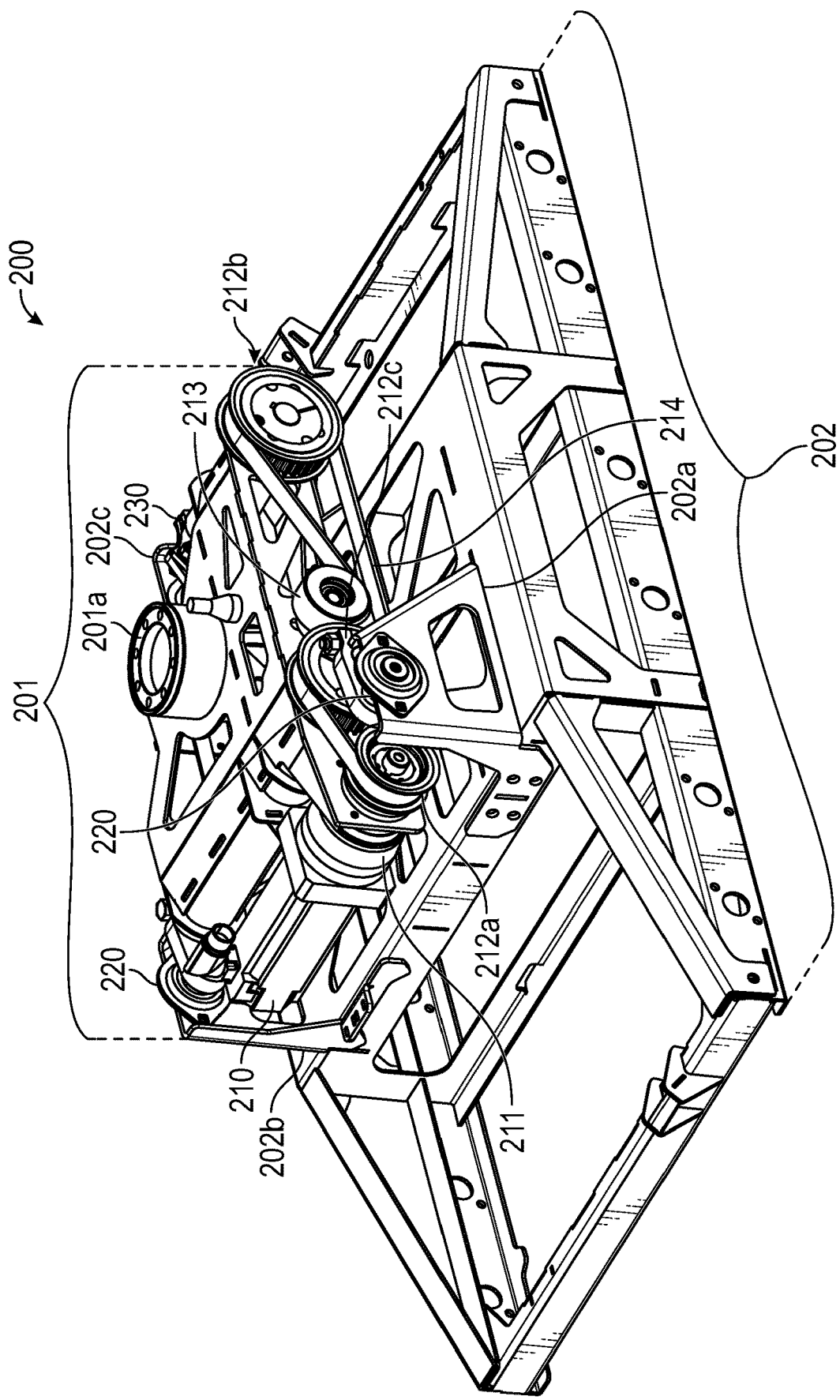
FIG. 2A illustrates a perspective view of a sod harvester stacking head that is configured in accordance with embodiments of the present invention.
Figure 2B:
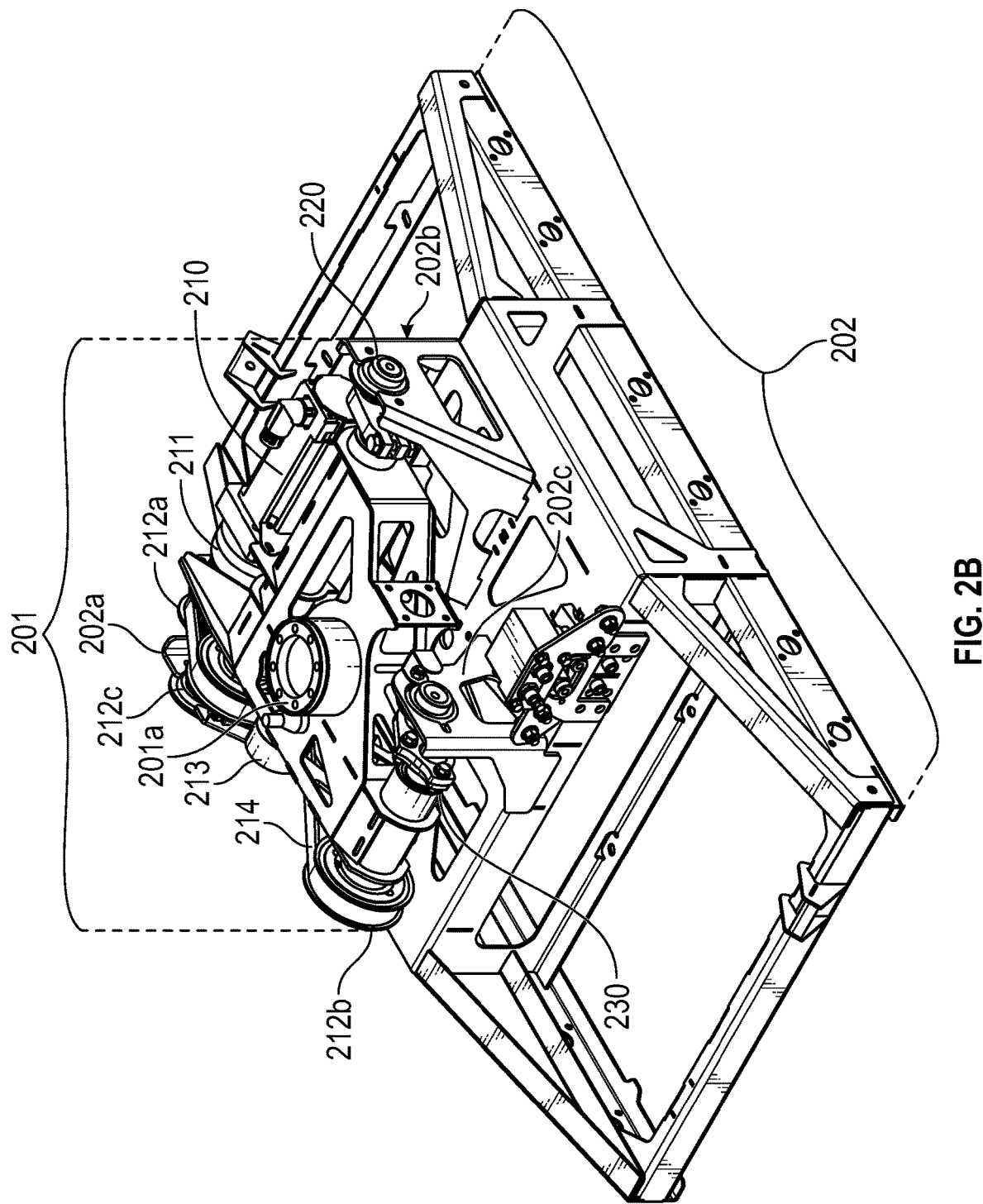
FIG. 2B illustrates another perspective view of the sod harvester stacking head of FIG. 2A.
Figure 2C:
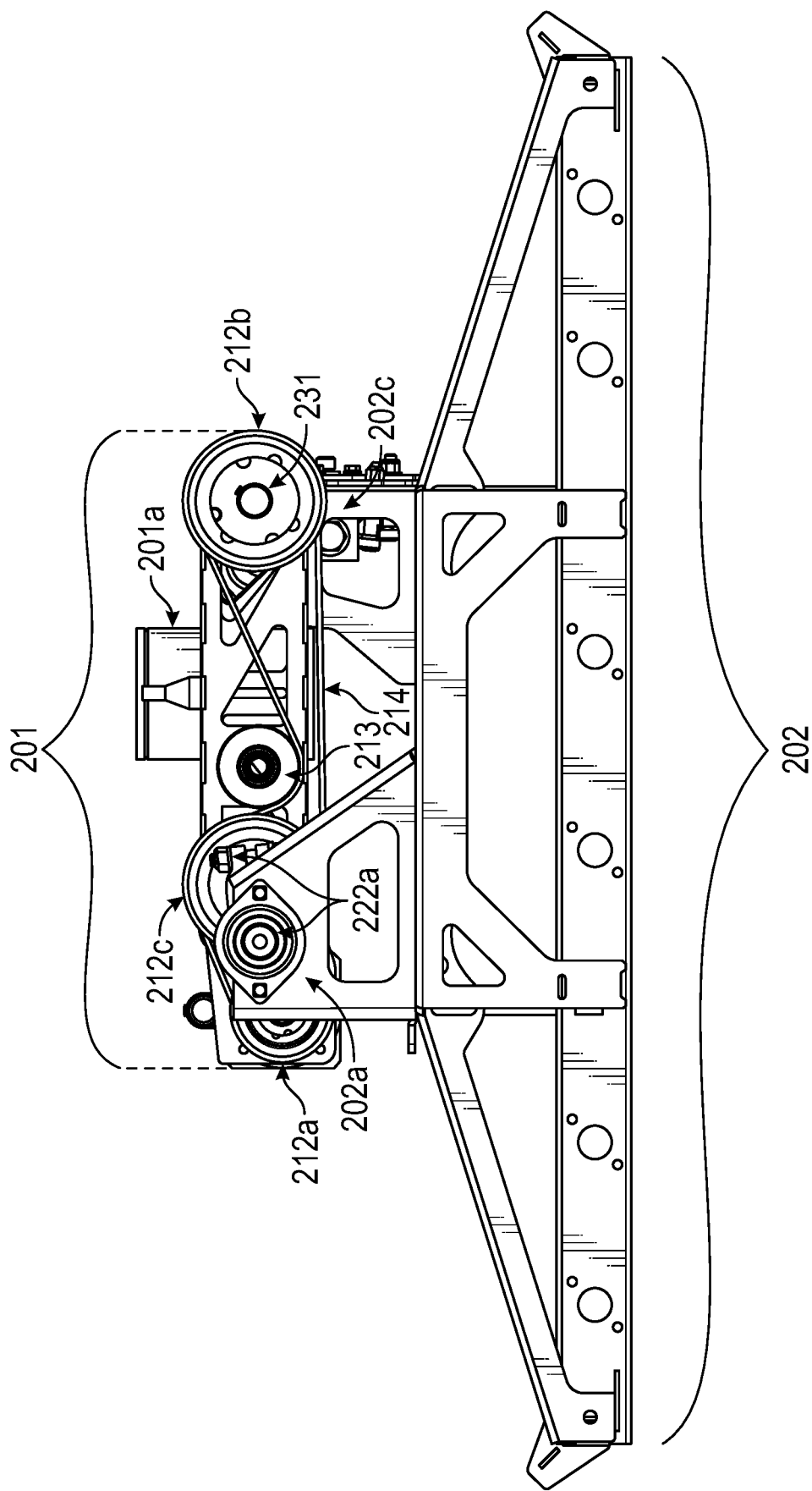
FIG. 2C illustrates a side view of the sod harvester stacking head of FIG. 2A.
Figure 2D:
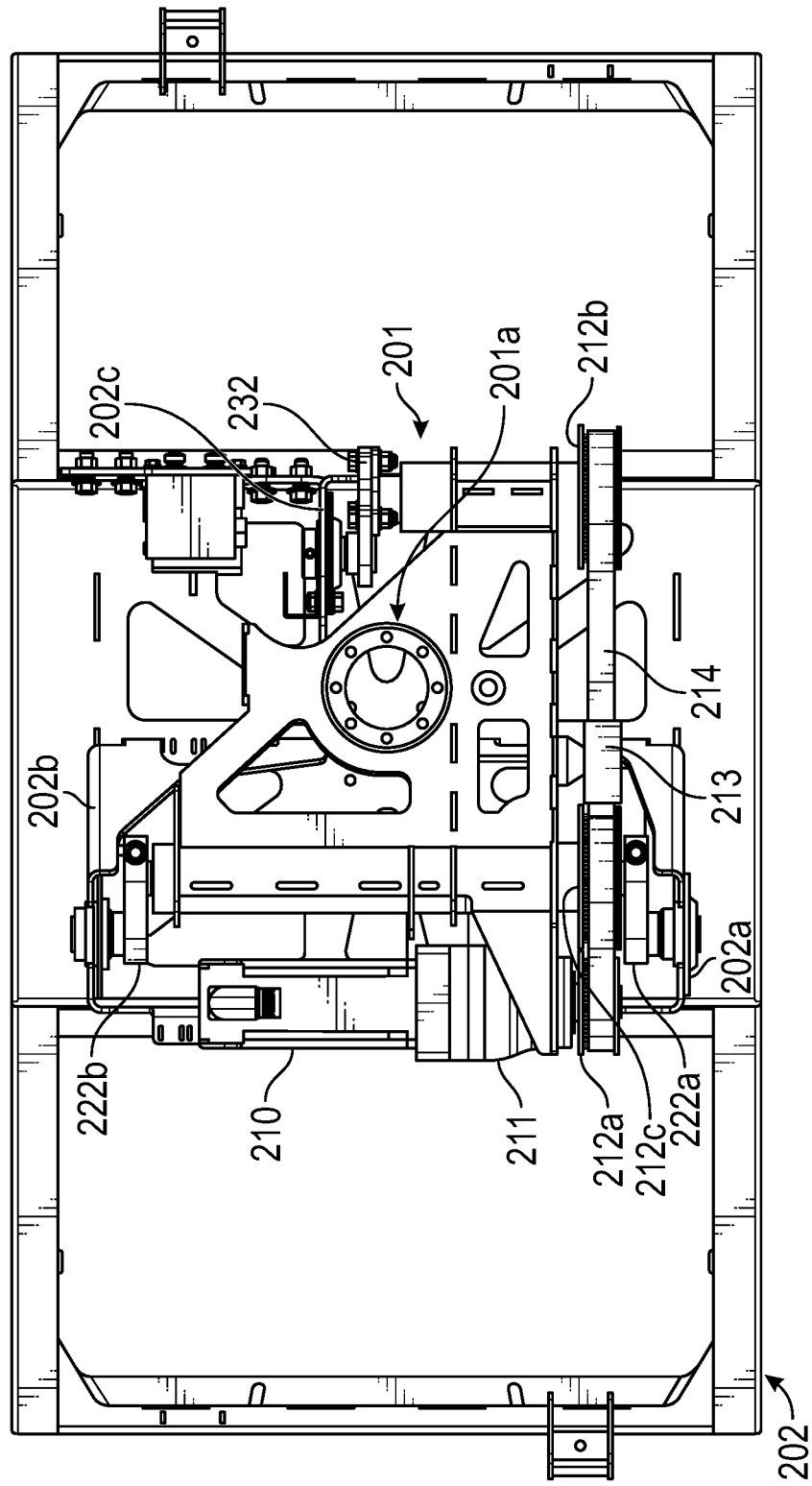
FIG. 2D illustrates a top view of the sod harvester stacking head of FIG. 2A.

In this specification, a sod harvester stacking head (or simply stacking head) should be construed as the component of a sod harvester that removes slabs of sod from a stacking conveyor and stacks the slabs on a pallet or other structure. A stacking conveyor should be construed as the conveyor or conveyors on which the slabs are positioned when they are picked up by the stacking head. The stacking conveyor(s) may typically be in a horizontal orientation inline with one or more inclined conveyors, but the present invention should not be limited to these typical orientations. Sod securing components should be construed as any mechanical structure that is coupled to the stacking head and functions to secure the slabs of sod so that they are removed from the stacking conveyor when the stacking head is elevated relative to the stacking conveyor. By way of example, sod securing components may be clamps, hooks, prongs, etc.

FIGS. 2A-2F illustrate a number of views of a stacking head 200 that is configured in accordance with embodiments of the present invention. Stacking head 200 can be employed in place of stacking head 105 on sod harvester 100 or on any other sod harvester that employs a stacking head. Stacking head 200 includes a base 201 and a frame 202. Although not shown, frame 202 would include a number of sod securing components that would be actuated during a stacking operation to pick up slabs of sod from the stacking conveyor. The sod securing components could be configured to secure rolled or unrolled slabs while they are transported to a pallet for stacking.

Frame 202 includes a number of extensions 202a-202c by which the frame is coupled to base 201. In the depicted embodiment, extensions 202a and 202b are positioned on opposing sides and towards the rear of base 201 while extension 202c is positioned towards the front of base 201. In this context, front and rear are merely relative terms and should not be construed as defining which end of stacking head 200 is oriented towards the front or rear of the sod harvester. In other words, either end of stacking head 200 could be oriented towards the front of the sod harvester. Extensions 202a-202c are configured to provide spacing between frame 202 and base 201 to thereby allow frame 202 to move vertically relative to base 201.

Base 201 includes a rotating coupling 201a by which base 201 can be mounted to a support mechanism such as support mechanism 104 in FIG. 1. Rotating coupling 201a allows stacking head 200 to be rotated at least 90 degrees so that the slabs of sod can be stacked in rotated orientations. Although not shown, the support mechanism to which base 201 couples can be configured to transport stacking head 200 in a lateral (i.e., horizontal) direction so that frame 202 can be positioned above the stacking conveyor and above the pallet or other slab support structure.

In accordance with embodiments of the present invention, base 201 includes multiple crankshaft assemblies 220 and 230 by which base 201 couples to frame 202. Crankshaft assembly 220 is positioned towards the rear of base 201 and couples to extensions 202a and 202b while crankshaft assembly 230 is positioned towards the front of base 201 and couples to extension 202c. A primary role of crankshaft assemblies 220 and 230 is to allow frame 202 to be rotated through 360 degrees during a stacking operation.

Figure 3:
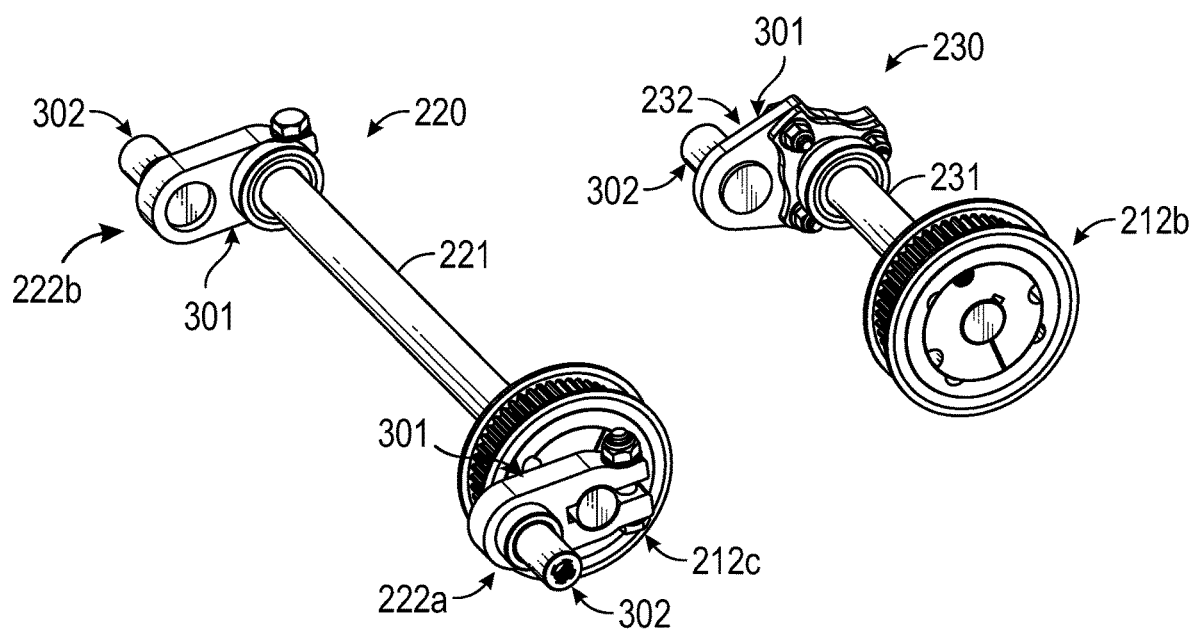
FIG. 3 illustrates an isolated view of the crankshaft assemblies that are included in the sod harvester stacking head of FIG. 2A.

FIG. 3 provides an isolated view of crankshaft assemblies 220 and 230. As shown, crankshaft assembly 220 includes a shaft 221 that extends through a rear portion of base 201. A crankshaft 222a, 222b is coupled at each end of shaft 221. Similarly, crankshaft assembly 230 includes a shaft 231 that extends through a front portion of base 201. In the depicted embodiment, crankshaft assembly 230 includes a single crankshaft 232 that is coupled at one end of shaft 231. It is noted, however, that in some embodiments, crankshaft assembly 230 could be configured in the same manner as crankshaft assembly 220 (i.e., with a crankshaft on both ends of shaft 231). In such cases, the front portion of base 201 could be configured similar to the rear portion of base 201 and frame 202 could include corresponding extensions.

One benefit of the configuration of crankshaft assembly 230 is that a single crankshaft 232 is employed thereby reducing the number of components. With this single crankshaft configuration, base 201 and extension 202c can be configured so that crankshaft 232 is positioned at or near a longitudinal axis of base 201 such that the load from frame 202 will be substantially centered about crankshaft 232.

As best seen in FIG. 3, each of crankshafts 222a, 222b, and 232 is comprised of an arm portion 301 and a pin portion 302. A first end of arm portion 301 is secured to the corresponding end of shaft 221 or 231, and pin portion 302 extends laterally from the second end of arm portion 301 and is configured to insert into bearings attached to the corresponding extension 202a, 202b, or 202c of frame 202. Because pin portion 302 is positioned at the second end of arm portion 301, pin portion 302 is offset from the axis of the corresponding shaft 221 or 231. This "offset length" is defined by the length of arm portion 301, and each of crankshafts 222a, 222b, and 232 can have the same offset length. In some embodiments, the width of arm portion 301 of crankshaft 232 can be increased relative to crankshafts 222a and 222b. This increased width functions to reinforce crankshaft 232 in embodiments where crankshaft assembly 230 employs a single crankshaft.

By employing crankshafts 222a, 222b, and 232 to couple base 201 to frame 202, frame 202 can be moved vertically relative to base 201 using a rotating motion. Also, the configuration of crankshafts 222a, 222b, and 232 allow frame 202 to be lowered and raised using a single direction of rotation. In particular, as shafts 221 and 231 are rotated 360 degrees, crankshafts 222*a*, 222*b*, and 232 will cause frame 202 to traverse a complete circle. The diameter of this circle will be based on the offset length of the crankshafts. For example, if the offset length is 1.75 inches, the vertical travel of frame 202 will be 3.5 inches—double the offset length.

Because crankshafts 222*a* and 222*b* are coupled to the same shaft 221, their orientation will remain synchronized during the rotation of shaft 221 thereby ensuring that the rear end of frame 202 remains level. To ensure that the orientation of crankshaft 232 remains synchronized with the orientations of crankshafts 222*a* and 222*b* (thereby ensuring that the front end of frame 202 remains level with the rear end), crankshaft assemblies 220 and 230 can include sprockets 212*c* and 212*b* respectively. As best seen in FIG. 3, sprocket 212*c* can be coupled to shaft 221 and sprocket 212*b* can be coupled to shaft 231 via a bushing or other suitable structure. Sprockets 212*b* and 212*c* can be linked via a belt 214 which is driven by motor 210 via gear reducer 211 and sprocket 212*a*. A pulley 213 may be positioned between sprockets 212*c* and 212*b* to provide tension to belt 214 to thereby ensure that the rotation of sprocket 212*b* remains synchronized with the rotation of sprocket 212*c*.

As motor 210 rotates sprocket 212*a*, belt 214 will cause sprockets 212*b* and 212*c* to be rotated in the same amount. To implement a stacking operation, motor 210 can be driven to cause sprockets 212*b* and 212*c* to complete 360 degrees of rotation. Because of the offset length of crankshafts 222*a*, 222*b*, and 232, this rotation will cause frame 202 to traverse a vertically oriented circular path.

FIG. 4A illustrates an example of how stacking head 200 can be operated. Initially, motor 210 can cause each of crankshafts 222*a*, 222*b*, and 232 to be oriented in an upward direction such that frame 202 is in a lifted position as is represented by the top diagram. Stacking head 200 can be in this state prior to and after removing slabs of sod from the stacking conveyor. For example, stacking head 200 can remain in this state overtop of the stacking conveyor as slabs are accumulated on the stacking conveyor. Then, once the appropriate number of slabs have been accumulated on the stacking conveyor, motor 210 can be driven to cause crankshafts 222*a*, 222*b*, and 232 to be rotated downwardly (e.g., clockwise). This rotation will cause frame 202 to descend towards the slabs on the stacking conveyor until reaching the lowered position as is represented by the bottom diagram. In conjunction with this descent, the sod securing components can be actuated to thereby secure the slabs.

The continued rotation of crankshafts 222*a*, 222*b*, and 232 will cause the slabs to be picked up from the stacking conveyor as frame 202 is returned to the lifted position. Importantly, motor 210 can be driven until crankshafts 222*a*, 222*b*, and 232 have completed 360 degrees of rotation thereby returning the crankshafts to be oriented in the upward direction. At this point, the slabs of sod will be secured to frame 202 and removed from the stacking conveyor. Because crankshafts 222*a*, 222*b*, and 232 are oriented in the upward direction, the load on frame 202 will be substantially balanced on the rotational axis of stacking head 200 (i.e., the load will be substantially centered around rotational coupling 201*a* which can be centered relative to frame 202). As a result, as stacking head 200 is moved laterally towards the pallet, the torque on rotational coupling 201*a* will be minimalized especially during stacking operations that require rotation of stacking head 200. Similarly, because crankshafts 222*a*, 222*b*, and 232 are oriented in an upward direction while frame 202 carries the slabs of sod, there will be minimal torque on the crankshafts (i.e., the load will apply a downward force along the length of the crankshafts). This reduction in torque not only prolongs the life of the various components, but also decreases the amount of energy that is required to operate a sod harvester.

In FIG. 4A, it is assumed that crankshafts 222*a*, 222*b*, and 232 are in an upward orientation prior to and after picking up sod from the stacking conveyor. However, this need not be the case. For example, prior to causing frame 202 to descend towards the stacking conveyor to pick up sod, crankshafts 222*a*, 222*b*, and 232 may be oriented in a non-vertical direction (e.g., to the right in the example shown on the left side of FIG. 4A). After picking up the sod, crankshafts 222*a*, 222*b*, and 232 could then be rotated to a non-vertical orientation (e.g., to the left) while transporting the sod for stacking on a pallet. In other words, although there may be benefits to orienting crankshafts 222*a*, 222*b*, and 232 in a vertical direction prior to and after picking up sod, the present invention should not be limited to such embodiments and should extend to embodiments that employ crankshafts that can be rotated through 360 degrees regardless of the particular orientation of the crankshafts at any particular time during the stacking operation. Additionally, in some embodiments, the crankshafts may be driven in multiple increments to complete 360 degrees of rotation. For example, with reference to FIG. 4A and assuming the upward direction is 0 degrees, the crankshafts could initially be oriented at 90 degrees prior to causing frame 202 to descend to pick up sod, then rotated 270 degrees to cause the crankshafts to be vertically oriented while transporting the sod, and then rotated back to 90 degrees prior to initiating the next stacking operation.

Figure 4B:
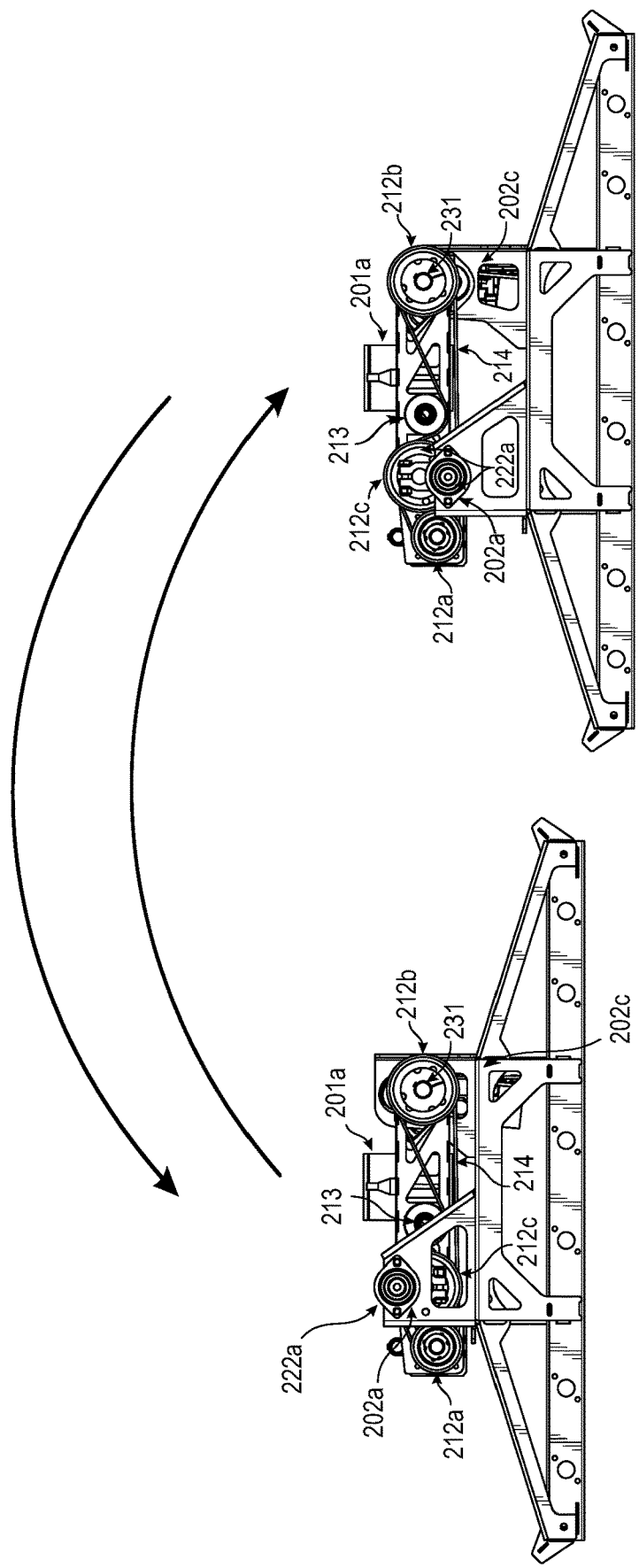

Further, although the crankshafts may allow frame 202 to travel through 360 degrees of rotation, the present invention should not be limited to stacking operations that involve 360 degrees of rotation. For example, rather than traversing a complete circle during a stacking operation, crankshafts 222*a*, 222*b*, and 232 could instead be driven to travel in one direction when lowering frame 202 and in an opposite direction when raising frame 202. As an example, FIG. 4B illustrates how crankshafts 222*a*, 222*b*, and 232 are initially rotated in a clockwise direction to lower frame 202 towards the sod and then reversed in a counterclockwise direction to raise frame 202. In this example, frame 202 would traverse a half circle. However, in other embodiments, crankshafts 222*a*, 222*b*, and 232 could cause frame 202 to traverse more or less than 180 degrees during this process. As an example only, crankshafts 222*a*, 222*b*, and 232 could be oriented horizontally before and after picking up the sod such that frame 202 traverses approximately a quarter circle. In short, crankshafts 222*a*, 222*b*, and 232 could be driven in accordance with various different rotational schemes.

Although the present invention has been described in the context of a stacking head, the same techniques could be employed on the stacking conveyor to elevate slabs of sod towards the stacking head as opposed to lowering the stacking head towards the stacking conveyor. For example, the stacking conveyor could be divided into a base and frame similar to base 201 and frame 202. In some embodiments, the frame can form the structure of the stacking conveyor such that the entire stacking conveyor structure can be elevated relative to the base using crankshaft assemblies in the same manner as described above. Alternatively, rather than elevating the entire stacking conveyor structure, the frame could be in the form of a component that alters the shape of the stacking conveyor (without elevating the entire stacking conveyor structure) to elevate the slabs while they remain on the stacking conveyor or in the form of a component that extends upwardly between parallel portions of the stacking conveyor to thereby lift the slabs of sod from the stacking conveyor. In short, frame 202 as described above could be replaced with another structure that functions as part of the stacking conveyor to lift slabs of sod towards a stacking head while the coupling between the base and frame could be implemented using the same or substantially similar configuration of crankshaft assemblies as described above. In such cases, the stacking head could be configured to remain in a fixed vertical position or may be configured to descend towards the stacking conveyor as the stacking conveyor and/or slabs are lifted.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A sod harvester stacking head comprising:
   a base that is configured to mount to a support mechanism overtop a stacking conveyor of a sod harvester, the support mechanism enabling the stacking head to travel in a lateral direction to stack slabs of sod that were removed from the stacking conveyor; and
   a frame that is coupled to the base via one or more crankshaft assemblies, the one or more crankshaft assemblies being configured to cause the frame to travel through 360 degrees of rotation in the same direction during a stacking operation.

2. The sod harvester stacking head of claim 1, wherein the one or more crankshaft assemblies comprise a first crankshaft assembly positioned towards a first end of the base and a second crankshaft assembly positioned towards a second end of the base opposite the first end.

3. The sod harvester stacking head of claim 2, wherein the first crankshaft assembly includes a first shaft that extends between opposing sides of the base and crankshafts coupled on opposing ends of the first shaft.

4. The sod harvester stacking head of claim 3, wherein the second crankshaft assembly includes a second shaft that extends between opposing sides of the base and a crankshaft coupled on one end of the second shaft.

5. The sod harvester stacking head of claim 4, wherein each crankshaft comprises an arm portion having a first end that couples to the corresponding shaft and a second end, each crankshaft further comprising a pin portion that extends from the second end of the arm portion, the pin portion coupling to the frame.

6. The sod harvester stacking head of claim 5, wherein the pin portion is offset from an axis of the corresponding shaft by an offset length.

7. The sod harvester stacking head of claim 6, wherein the offset length is the same for each crankshaft.

8. The sod harvester stacking head of claim 7, wherein the offset length is between 1.5 inches and 2.0 inches.

9. The sod harvester stacking head of claim 4, wherein the second crankshaft assembly includes crankshafts coupled on opposing ends of the second shaft.

10. The sod harvester stacking head of claim 4, wherein the first shaft is longer than the second shaft.

11. The sod harvester stacking head of claim 10, wherein the crankshaft of the second crankshaft assembly is positioned at a longitudinal axis of the base.

12. The sod harvester stacking head of claim 5, wherein the first crankshaft assembly includes a first sprocket coupled to the first shaft and the second crankshaft assembly includes a second sprocket coupled to the second shaft, the sod harvester stacking head further comprising a belt that couples the first sprocket to the second sprocket to cause the first and second sprockets to be rotated synchronously.

13. The sod harvester stacking head of claim 12, further comprising:
   a motor that is coupled to a third sprocket, the belt extending around the third sprocket.

14. The sod harvester stacking head of claim 12, further comprising:
   a motor that causes each crankshaft to be oriented in an upward direction while the stacking head travels in the lateral direction.

15. A sod harvester comprising:
   a cutting head configured to cut slabs of sod from the ground;
   one or more inclined conveyors that are configured to receive the slabs and advance the slabs towards a stacking conveyor;
   the stacking conveyor that is configured to support one or more slabs prior to a stacking operation; and
   a stacking head that is configured to remove the one or more slabs from the stacking conveyor as part of the stacking operation, the stacking head comprising a base and a frame, the base being coupled to a support mechanism that enables the stacking head to travel in a lateral direction, the frame being coupled to the base via one or more crankshaft assemblies that enable the frame to be rotated through 360 degrees in the same direction during the stacking operation.

16. The sod harvester of claim 15, wherein the one or more crankshaft assemblies include a first crankshaft assembly that includes a first shaft and crankshafts coupled to opposing ends of the first shaft and a second crankshaft assembly that includes a second shaft and either a crankshaft coupled to one end of the second shaft or crankshafts coupled to opposing ends of the second shaft, each crankshaft comprising an arm portion having a first end that is coupled to the corresponding shaft and a pin portion that extends from a second end such that the pin portion is offset from a rotational axis of the corresponding shaft.

17. The sod harvester of claim 16, wherein the pin portion of each crankshaft is offset from the rotational axis of the corresponding shaft by the same offset length and the first and second shafts are configured to be rotated synchronously such that the frame rotates circularly during the stacking operation.

18. A sod harvester stacking head comprising:
   a base that includes a rotational coupling by which the stacking head is coupled to a sod harvester; and
   a frame that couples to the base via first and second crankshaft assemblies, the frame including sod securing components;
   the first crankshaft assembly comprising a first shaft that extends between opposing sides of the base at a first end of the base and crankshafts coupled to opposing ends of the first shaft;
   the second crankshaft assembly comprising a second shaft that extends between opposing sides of the base at a second end of the base opposite the first end and either a crankshaft coupled to one end of the second shaft or crankshafts coupled to opposing ends of the second shaft;

each crankshaft comprising an arm portion having a first end coupled to the corresponding shaft and a second end from which a pin portion extends such that the pin portion is offset from a rotational axis of the corresponding shaft, each pin portion coupling to the frame.

19. The sod harvester stacking head of claim 18, wherein the first crankshaft assembly includes a first sprocket coupled to one end of the first shaft and the second crankshaft assembly includes a second sprocket coupled to one end of the second shaft, the sod harvester stacking head further comprising a belt that synchronizes the second sprocket with the first sprocket.

20. The sod harvester stacking head of claim 18, further comprising:
   a motor that drives the first and second crankshaft assemblies to perform a sod stacking operation, wherein the motor is configured to either:
   drive the first and second crankshaft assemblies through 360 degrees of rotation for each sod stacking operation; or
   drive the first and second crankshaft assemblies in a first direction of rotation to cause the frame to descend and in a second direction of rotation opposite the first direction to cause the frame to ascend for each sod stacking operation.

* * * * *